May 3, 1932.  W. F. PRICE  1,856,508
AUTOMOBILE EMBLEM ATTACHMENT
Filed March 8, 1929
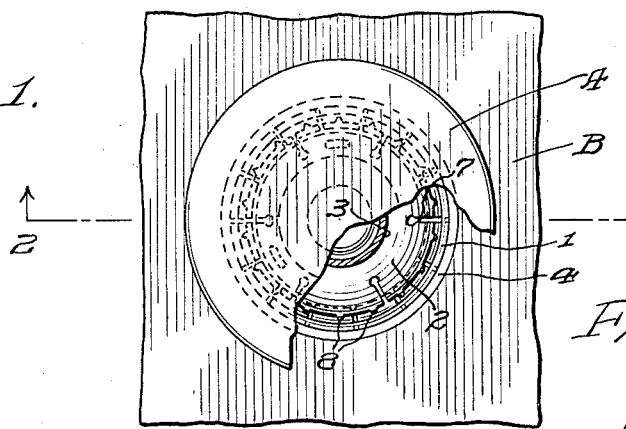
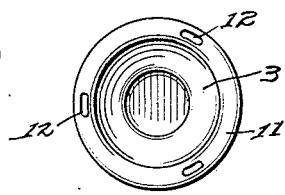
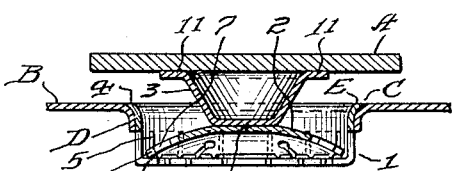
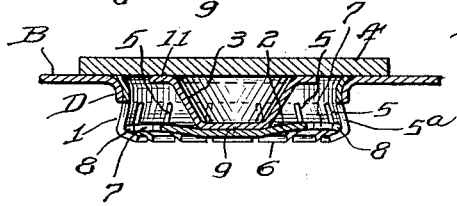
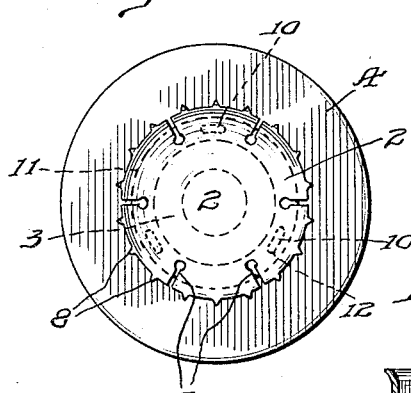
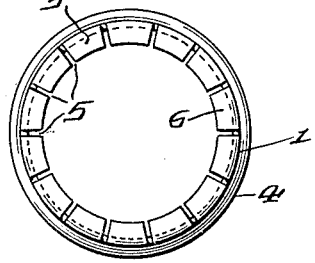
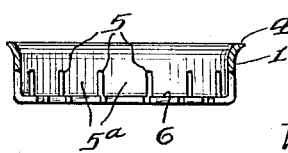
WITNESS
F. J. Hartman.
INVENTOR
Wilbur F. Price.
BY John D. Myers
ATTORNEY Patented May 3, 1932

1,856,508

UNITED STATES PATENT OFFICE

WILBUR F. PRICE, OF ALLENTOWN, PENNSYLVANIA, ASSIGNOR TO L. F. GRAMMES & SONS, INC., A CORPORATION OF MARYLAND

AUTOMOBILE EMBLEM ATTACHMENT

Application filed March 8, 1929. Serial No. 345,552.

The present invention relates generally to fastening devices, and more particularly to that type in which parts of the fastening device are carried, respectively, by two members to be secured together, and are so engaged by merely pressing the members together, as to retain such members in association.

An object of the invention is to provide a device of this character which is especially adapted for use in securing a name or emblem plate or like member in position on its supporting member, such as, for instance, the radiator shell of an automobile.

Another object of the invention is to provide a fastening device which is designed to secure a name or emblem plate to a radiator shell without the necessity for any special construction or formation of the shell, but merely employing the circular opening with which it is usually provided for this purpose.

Another object of the invention is to provide a fastening device which not only holds the plate securely to the radiator shell against accidental detachment, but also serves to prevent both independent vibration of the plate and its turning movement with respect to the shell.

A further object is to provide a fastening device which is normally entirely concealed from view, so as not to detract from the ornamental appearance of the plate and the radiator shell.

A further object is to provide a fastening device which will not ordinarily permit the detachment of the plate from the shell without injuring such fastening device and rendering it thereafter inoperative, but which will, however, make possible the removal of the plate, if this should become necessary, without defacing or marring either the plate or the shell.

A still further object is to provide a device of the character described, which is simple in construction, inexpensive to manufacture, and durable and efficient in use.

With these and other objects in view, the invention comprises the various novel features of construction, combinations of elements and arrangements of parts, hereinafter described and more particularly pointed out in the appended claims.

In the accompanying drawings, illustrating one embodiment of the invention:—

Figure 1 is a front elevation, partly broken away, showing my improved fastening device applied, but before the parts are pressed into locking engagement;

Fig. 2 is a horizontal section on the line 2—2 of Fig. 1;

Fig. 3 is a similar horizontal section showing the positions of the parts after they have been pressed into locking engagement;

Fig. 4 is a rear face view of the plate showing the parts of the fastening device carried thereby;

Fig. 5 is a rear end view of the ferrule;

Fig. 6 is a longitudinal section of the ferrule;

Fig. 7 is a front end view of the spacer; and

Fig. 8 is a longitudinal section thereof.

The invention is shown as applied to a name or emblem plate A and the shell of an automobile radiator, a portion or section of which is indicated at B. The shell is of ordinary form, being usually constructed of relatively thin sheet metal and being provided with a circular opening C in which the plate is to be secured, and around the opening with a rearwardly or inwardly extending annular flange D. The front face of the shell is slightly rounded or beveled around the opening C, as shown at E, and is ordinarily so formed in and through pressing the metal of the shell rearwardly to provide the flange.

My improved fastening device usually comprises a ferrule or bushing 1, a toggle element 2 and a spacer or connecting piece 3.

In the embodiment of the invention herein shown for the purpose of illustration, the ferrule is cylindrical, formed of spring metal, and of a diameter to fit snugly within the circular opening C and annular flange D of the radiator shell B. The front or outer end of the ferrule is slightly flared, as indicated at 4, to fit the rounded corner E with its outer extremity flush with the front face of the shell. By this means the rearward movement of the ferrule within the shell is limited without there being any projection on the front face of the shell which would interfere with the plate A being pressed into firm and even contact therewith.

The ferrule is of a length somewhat greater than the flange D so as to project rearwardly or inwardly beyond the same, and has such projecting portion formed with a plurality of slits 5 extending longitudinally from its rear end and arranged at intervals around its circumference. These slits render the rear portion of the ferrule readily expansible, and provide a plurality of separate, spring arms 5ª which are adapted to yield radially under pressure. The rear extremities of the ferrule arms are inturned to form forwardly facing abutments or shoulders 6.

The toggle element 2 is in the form of a disk of flexible and preferably spring metal, which is normally concavo-convex and of a diameter to slip freely within the ferrule and which is designed to be inserted therein with its concave face disposed rearwardly and with marginal portions thereof bearing against the abutments 6.

This disk-shaped toggle element is provided with a plurality of slits 7 extending substantially radially inwardly from its periphery, and is also provided on its periphery with a plurality of teeth 8. The slits permit the toggle element to be readily flexed from its normal or inoperative position into its operative or locking position, as hereinafter described, while the teeth are designed in such locking position to grip the ferrule.

The spacer 3 connects the toggle element and the plate A in spaced relation, the rear end of the spacer being suitably secured, as by spot welding at 9, to the central portion of the toggle element in abuting relation to its front or convex face, and the front end of the spacer being suitably secured, as by being soldered as indicated at 10, to the rear face of the plate. In the present instance, the spacer is hollow and in the form of a truncated cone, the smaller end of which is closed and secured to the toggle element, while the larger end is provided with an outstanding peripheral flange 11 having slots 12 through which the flange is soldered to the plate A.

The spacer 3 is of a diameter to pass freely within the ferrule 1. The length of the spacer is such that when the parts are in the positions shown in Fig. 2, the plate A is spaced from the outer face of the shell B a distance slightly greater than, but less than twice, the distance between the central portion of the toggle element 2 and a plane through its edge.

To lock the plate A in position after the parts have been initially assembled in the positions shown in Fig. 2, it is merely necessary to press the plate rearwardly into contact with the shell B. This actuates the toggle element, flexing the same and moving the central portion thereof rearwardly slightly past a dead center, that is, slightly beyond a plane through its edge, so that the parts assume the positions shown in Fig. 3.

The disk-shaped toggle element is then slightly reversely dished with respect to its normal position, and positively expanded within the rear portion of the ferrule into locking engagement therewith. The arms 5ª are sprung outwardly under the expanding force of the toggle element, so that the ferrule is expanded behind the shell B and the flange D thereof and thus secured against withdrawal from the opening C. The tension of the opposite spring arms 5ª inwardly towards each other, holds the toggle element firmly in its operative or locking position and yieldingly resists its return to its original position. The plate A is thus securely fastened to the shell B and held under tension in firm and even contact therewith. The teeth 8 grip the ferrule and prevent the toggle element from turning therein, which might otherwise result in the plate A becoming accidentally rotated on the shell and shifted out of proper alinement.

The plate A, while being secured by my improved device to the radiator shell B against accidental detachment, may, however, be removed therefrom, if occasion requires, without marring or otherwise defacing the exterior surface of either the plate or the shell, but when the toggle element is in the form herein shown and described it may be deformed upon the removal of the plate so that it does not return to its original shape, and hence the fastening device may be rendered inoperative and incapable of reuse, until the toggle element has been suitably reformed.

The toggle element herein shown and described comprises, theoretically, a plurality of toggles arranged diametrically with respect to a common center. However, the invention is broad enough to include the use of one or any suitable number of toggles, and to include toggles having a knuckle joint at the center as well as those which are unjointed and depend upon flexure for their toggle movement.

Furthermore, various other changes may be made in the form and arrangement of the parts and the details of construction without departing from the spirit or scope of the invention as defined in the appended claims.

While the invention is particularly adapted for use in fastening emblem or name plates to the radiator shells of automobiles, it is not limited to such use, but is susceptible of being employed for various other purposes for which a device of this character is suitable or appropriate.

Having thus described my invention, I claim and desire to protect by Letters Patent of the United States—

1. A device of the character described, comprising a member having an opening and an internal abutment, a separate toggle element adapted to be inserted within and across said opening and seated against said abutment, a plate to be attached to said member, and a spacer connecting the toggle element and said plate, whereby upon the pressing of the plate against said member the toggle element is operated past its dead center and secured within said member.

2. A device of the character described, comprising a member having an opening, a separate toggle element adapted to be inserted within said opening, means for operating said toggle element to move it past its dead center and thereby expand it into locking position, and means carried by said member for yieldingly resisting return of said toggle element to its original position.

3. A device of the character described, comprising a hollow part having an expansible, spring portion, a separate toggle element adapted to be inserted within such portion, means for limiting such movement of the toggle element, and means for applying operating force to said toggle element in the direction of its insertion to move it past its dead center and thereby expand said spring portion and secure the toggle element therein.

4. A device of the character described, comprising a hollow part provided with spring arms having abutments, a separate toggle element adapted to be inserted within said hollow part against said abutments and in cooperative relation to said spring arms, and means for operating said toggle element in the direction of its insertion to move it past its dead center and thereby expand it into locking engagement with said arms.

5. A device of the character described, comprising a hollow part, a toggle element adapted to be inserted in one direction within such hollow part, means for limiting the movement of said toggle element in said direction within said hollow part, and means for applying operating force to said toggle element in said direction to move it past its dead center and thereby lock it against withdrawal from said hollow part.

6. A device of the character described, comprising a hollow part provided with an interior abutment, a flexible, concavo-convex, disk-shaped element adapted to be inserted within and transversely of said part with a marginal portion of its concave face bearing against said abutment, and a part secured substantially centrally to the convex face of said element and adapted to extend outwardly through and beyond said hollow part and to be secured to a member to be fastened by the device, whereby upon pressure being exerted upon the member the element is flexed and positively expanded into locking engagment with said hollow part.

7. The combination with two members to be secured together, one of which is formed with an opening, a toggle element secured to the other member in spaced relation thereto and inserted in said opening, and means for limiting the inward bodily movement of said toggle element in said opening, whereby the toggle element may be operated past its dead center and thereby expanded and locked against withdrawal from said opening, by and upon the pressing of said members together.

8. The combination with a member having an opening and a plate to be secured to said member, of spring parts carried by said member adjacent said opening, and a toggle element secured to the plate in spaced relation thereto and inserted in said opening and adapted to be operated past its dead center and thereby expanded into locking engagement with said spring parts, by and upon the pressing of the plate against the member.

9. The combination with two members to be secured together, one of which has an opening, of a separate ferrule inserted within said opening and expansible behind said last mentioned member, and a toggle element secured to the other member in spaced relation thereto and inserted within said ferrule and adapted to be operated past its dead center by and upon the pressing of said members together, to expand said ferrule and thereby secure said members together.

10. The combination with a member having an opening, and a plate to be secured thereto, of a flexible, concavo-convex element inserted in said opening with its concave face disposed inwardly, means for engaging marginal portions of said concave face to limit the inward movement of said element with respect to said member, and means for connecting the plate and the central portion of the convex face of said element in spaced relation with the plate spaced from the member a distance greater than, but less than twice, the distance between the central portion of the element and the plane of its marginal portions, whereby to cause the element to be expanded and locked against withdrawal from said opening, by and upon the pressing of the plate against said member.

11. A device of the character described, comprising a member having an opening and an internal abutment, a concavo-convex, flexible element adapted to be inserted within and transversely of said opening and seated against said abutment, a plate to be attached to said member, and a spacer connecting the plate and the central portion of the convex face of said element, whereby upon the plate being pressed against the member the central portion of said element is flexed past the plane of its marginal portions and secured within said member.

12. In a device of the character described, a normally concavo-convex, flexible element, and a spacer secured to and projecting from the central portion of the convex face of said element and adapted to be secured to a member to be attached by said element, the element having a plurality of slits extending inwardly from its periphery and being adapted to be reversely dished and expanded by pressure exerted thereon through said spacer.

In testimony whereof I have signed my name to this specification.

WILBUR F. PRICE.